3,567,818
PELLETS FOR SUPPLYING COPPER
TO RUMINANTS
Reginald Gordon Hemingway, Bearsden, and Norman S. Ritchie, Glasgow, Scotland, assignors to The University Court of the University of Glasgow, Glasgow, Scotland
No Drawing. Filed Dec. 12, 1966, Ser. No. 600,746
Claims priority, application Great Britain, Dec. 17, 1965, 53,316/65
Int. Cl. A61j 3/00
U.S. Cl. 424—14                                12 Claims

ABSTRACT OF THE DISCLOSURE

Copper necessary for the nutrition of ruminants may be supplied by administering thereto a pallet or bullet comprising an alloy containing between 40% and 70% by weight copper, from 0 to 15% by weight of aluminium and a total of from 0 to 5% by weight of one or more of a trace element selected from the group consisting of cobalt, zinc and manganese, the balance being magnesium. It has also been found that the rate of release of copper from the pellet in the ruminal juices can be controlled by varying the proportion of aluminium.

---

This invention relates to animal dietary supplements. More particularly, it relates to a means of supplying copper to ruminants by administering to such ruminants a copper containing pellet or bullet.

Copper is a mineral necessary for the nutrition of ruminants and in particular for the nutrition of dairy cattle, beef cattle and sheep. Copper-deficient forage areas for dairy cattle, beef cattle and sheep are found in various parts of the world. Copper deficiency of dairy cows and beef cattle results in stunted growth, anaemia, diarrhoea, loss of appetite and loss of weight. In sheep, it is the cause of swayback in lambs. This deficiency is known as enzootic ataxia in Australia. The deficiency is characterized by incoordination of movement. Mortality of affected lambs is high. Mature sheep develop symtoms of copper deficiency after being on a copper-deficient diet for about a year. In the growing or adult sheep the deficiency is characterized by anaemia, emaciation and a "stringy" or "steely" wool.

The customary method of supplying the necessary copper to an animal is to administer to the animal a preparation containing at least one of the salts of copper. This method of administration requires constant supervision and regular precise dosage. It is an object of the present invention to provide a means of providing the necessary continuous supply of copper to an animal without the necessity for continuing and close supervision and attention.

The invention is particularly useful for supplying copper to ewes shortly before conception or during pregnancy as copper is then most necessary to them to prevent swayback in the lambs which are subsequently born to them.

In our prior British patent specification No. 1,030,101 we disclose and claim a pellet for administration to ruminants which consists of an alloy of magnesium and aluminum which may contain up to 5% by weight of copper.

It is desirable in the control or prevention of copper deficiencies in ruminants, and particularly for the prevention of swayback in lambs, to administer to the animal or to the pregnant ewe, an agent capable of releasing greater amounts of copper into the ruminal juices than are released by any single pellet of reasonable size consisting of an alloy. Of course, the pellet of the prior disclosure is mainly designed to treat magnesium deficiencies whereas the pellet of the present invention is a copper pellet and is useful in treating copper-deficiencies.

A pellet according to the present invention consists of an alloy containing between 40 and 70 percent by weight of copper and between 60 and 10 percent by weight of magnesium.

The pellet may also contain from 0 to 15 percent by weight of aluminum and from 0 to 5 percent by weight of at least one trace element, for example, cobalt.

A particularly useful pellet is one consisting of an alloy containing about 65 percent by weight of copper and about 35 percent by weight of magnesium and a trace of cobalt.

The pellet may be of any shape characterized by an absence of sharp edges or protuberances such as might injure the ruminant to which it is administered. Suitable shapes are: cylindrical, spherical, spheroidal and ovoid. For administration to pregnant ewes, the pellet may conveniently be a convex, e.g. hemispherically ended cylinder about ½ to ¾ in. in diameter and 1 to 2 in. long. The density of the pellet is preferably at least 2.25 g./cc. to avoid regurgitation. A pellet consisting of an alloy of 65% copper and 35% magnesium has a density of about 4 g./cc. A cylindrical pellet of this alloy, about ½ in. in diameter and about 1 in. long, contains about 7 g. of copper and weighs about 10–11 g.

A pellet suitable for administration to cattle can be similar in composition and density to a pellet for administration to sheep but with a length up to about 3 inches and a diameter about 1 inch. Both types of pellets can be administered by means of an oesophageal balling gun. To reduce loss of pellets by regurgitation or passage in faeces after administration, each pellet may be formed around a high density material (steel, for example), or particles of the high density material (e.g. iron shot of $\frac{1}{32}$–⅛-inch diameter) may be distributed in a matrix of the alloy.

As already indicated, the alloys used in the pellets of this invention may contain other elements in addition to copper and magnesium. For example, "trace" elements essential to the health of ruminants, such as cobalt, zinc and manganese, may be included in the alloy in small amounts (up to a total of 5% by weight). A particularly useful alloy, for example, may contain about 1% by weight of cobalt.

The pellets of this invention may be prepared by any means which are known to those familiar with the art. The simplest and most convenient method consists in melting a quantity of magnesium and copper in the desired proportions with a flux in an iron pot. The melt is stirred for 1 minute and then poured into upright cylindrical moulds of the desired dimensions.

A proportion of the copper released in the ruminal juices of ruminants is absorbed and stored in the liver. To be effective in the control of prevention of swayback in lambs, the concentration of copper in the liver of the pregnant ewe should exceed 20 p.p.m. during the second half of the gestation period. Lambs born with livers containing more than about 20 parts per million of copper in the liver dry matter would not normally develop swayback.

Ruminant animals, and sheep in particular, can develop copper poisoning by the absorption of excessive amounts of copper. Toxicity may occur if the copper concentration in the liver dry matter of a sheep exceeds about 1000 parts per million.

The rate of release of copper from the pellet in the ruminal juices depends on the proportion of aluminum in the alloy. Thus the period over which the release of copper takes place may be reduced by reducing the proportion of magnesium and increasing the proportion of aluminum up to 15% by weight of the alloy.

Examples of the pellet in practice are given below:

EXAMPLE I

It may be expected that the pellets can be administered to ruminant animals which receive different diets. The results presented in Table I record the means release of copper (mg. Cu/day) when sheep of several groups were given one pellet each. In each case the individual pellets were weighed prior to administration and again after a know period when the pellets were recovered from the rumeno-reticular sacs of the sheep.

TABLE I

| Diet | Number of sheep each given one pellet | Period of test (days) | Mean copper loss from pellet mg. Cu/day. |
|---|---|---|---|
| Trial No. | | | |
| 1 ............ Grass only ............ | 15 | 35 | 91 |
| 2 ............ do ............ | 9 | 42 | 96 |
| 3 ............ do ............ | 8 | 41 | 15 |
| 4 ............ Grass and small amount of concentrates each day. | 3 | 40 | 47 |
| 5 ............ do ............ | 4 | 70 | 81 |
| 6 ............ Concentrates in quantity grass. | 8 | 38 | 138 |
| 7 ............ do ............ | 6 | 42 | 142 |

Pellets according to the invention have also been tested in cattle fitted with permanent fistulas to provide openings into the rumen so that the pellets could be removed at intervals for weighing. Copper was released at rates comparable with those in respect of the sheep referred to in Table 1. In practice, to supplement the copper intake of cattle it will normally be necessary either to give more than one pellet or to provide a single pellet of larger dimensions.

EXAMPLE II

To confirm the value of the pellet in increasing the blood and liver copper status of sheep one pellet was administered to each of six sheep. Six comparable sheep acted as untreated controls. The sheep grazed together on turnips and grass for four weeks and in addition received some concentrates for a further week. All the sheep were slaughtered five weeks after administration of the pellets.

The mean liver copper concentration of the six treated sheep were 376 parts per million (range, 171–576) compared with 24 parts per million (range, 14.2–52.1) for the six untreated control sheep. The mean blood copper concentration of the treated sheep at slaughter was 0.90 part per million compared with 0.70 part per million for the control sheep.

EXAMPLE III

Experiments have been conducted on ten farms where the local veterinary surgeons had indicated a high risk of swayback. There were about 100 ewes on each farm. In each case one pellet was administered to about 50 of the ewes in mid-pregnancy. The remaining ewes (about 50) in each of the flocks received no treatment and acted as controls. Blood samples (for determination of copper) were obtained from a proportion (about 10) of the treated and control ewes on each of the farms immediately prior to treatment and subsequently in late pregnancy. (See Table II below).

TABLE II

| | Mean change in ewe blood copper concentration (parts per million) between pre-treatment and post treatment observations | | Number of lambs with swayback | |
|---|---|---|---|---|
| | Treated with pellet | Control | Treated with pellet | Control |
| Farm: | | | | |
| A | −.01 | +.05 | 0 | 2 |
| B | −.10 | −.33 | 0 | 0 |
| C | +.09 | +.23 | 0 | 0 |
| D | +.31 | +.31 | 0 | 2 |
| E | +.06 | −.21 | 0 | 3 |
| F | +.37 | (¹) | 0 | 0 |
| G | −.31 | −.11 | 0 | 0 |
| H | +.16 | +.06 | 0 | 0 |
| I | +.26 | −.67 | 0 | 2 |
| J | +.48 | +.47 | 0 | 2 |

¹ Not sampled.

Mean blood copper concentrations of the untreated ewes fell by more than 0.20 part per million between mid-and late pregnancy on three of the farms (B, E, and I). The pellet treatment led to increased blood copper concentrations at two of these farms (E and I) and the fall was much less than that for the control ewes at farm B.

A total of eleven swayback lambs were born to untreated ewes on five of these farms. No lambs with swayback were born to any of the treated ewes on any of the farms.

Liver copper analyses were conducted on the livers of a number of ewes which died prepartum and on the livers of a number of lambs which died close to the time of birth. The following mean results were obtained from liver copper concentrations (parts per million of dry matter).

10 treated ewes _____ 125.1
3 control ewes _____ 108.1
17 lambs born to treated ewes _____ 98.5
13 lambs born to control ewes _____ 39.3

The copper pellet treatment increased the mean liver copper concentration of both the ewes and the lambs.

EXAMPLE IV

To confirm the usefulness of the invention in controlling swayback in lambs one pellet was administered to each of fifty-two ewes. Fifty-two similar ewes acted as untreated controls. The ewes grazed herbage and in addition received a small daily feed of concentrates. Some lambs from each group of ewes were slaughtered shortly after birth so that copper concentrations in various tissues could be determined. Table III sets out the results.

TABLE III

|  | With pellet | No pellet |
|---|---|---|
| Number of ewes | 52 | 52 |
| Mean blood copper concentration of ewes: | | |
| Mid-pregnancy, p.p.m. | 0.44 | 0.41 |
| Late-pregnancy, p.p.m. | 0.47 | 0.37 |
| Number of lambs | 13 | 11 |
| Mean lamb liver copper concentration, p.p.m. | 28.0 | 9.0 |
| Mean lamb total liver copper content, mg. | 0.549 | 0.174 |
| Mean lamb blood copper concentration | 0.54 | 0.49 |
| Number of lambs born with swayback symptoms | 0 | 3 |

These experiments show that the administration of the copper pellet of this invention to pregnant ewes increased the copper levels of the ewes and prevented swayback in their lambs.

Similar results are obtained with pellets of the following compositions:

|  | Percentage by weight | | | | |
|---|---|---|---|---|---|
| Copper | 70 | 50 | 40 | 40 | 60 |
| Magnesium | 30 | 50 | 45 | 40 | 35 |
| Aluminum |  |  | 15 | 15 |  |
| Cobalt |  |  |  | 5 | 5 |
| Total | 100 | 100 | 100 | 100 | 100 |

It is also found that when pellets containing a 65/35 Copper/Magnesium alloy are administered to other ruminants such as goats, beef steers and dairy cows grazing on copper-deficient forage, their blood copper lever are increased.

What is claimed is:

1. A pellet for supplying copper to ruminants comprising an alloy containing between 40% and 70% by weight of copper, from 0 to 15% by weight of aluminum, a total of from 0 to 5% by weight of at least one trace element selected from the group consisting of cobalt, zinc and manganese, the balance being magnesium.

2. A pellet as claimed in claim 1 in which the alloy contains aluminum.

3. A pellet as claimed in claim 1 in which the alloy contains at least one trace element.

4. A pellet as claimed in claim 1 in which the alloy contains both aluminum and at least one trace element.

5. A pellet as claimed in claim 3 in which the trace element is cobalt.

6. A pellet as claimed in claim 1 in which the alloy contains about 65% by weight of copper, about 35% by weight of magnesium and a trace of cobalt.

7. A pellet as claimed in claim 1 having a density of at least 2.25 g./cc.

8. A pellet as claimed in claim 1 in the shape of a cylinder having convex ends.

9. A method of treating copper deficiency in ruminants which comprises administering to such ruminants an effective amount of a pellet comprising an alloy containing between 40% to 70% by weight copper, from 0 to 15% by weight aluminum, a total of from 0 to 5% by weight of one or more of a trace element selected from the group consisting of cobalt, zinc and manganese, the balance being magnesium.

10. The method of claim 9 wherein the alloy contains aluminum in an amount up to 15%.

11. The method of claim 9 wherein the alloy contains at least one of said trace elements in a total amount of up to 5% by weight.

12. The method of claim 9 wherein the alloy contains about 65% by weight of copper, about 35% by weight of magnesium and a trace of cobalt.

References Cited

UNITED STATES PATENTS

| 1,871,450 | 8/1932 | Gann | 75—168 |
| 2,028,575 | 1/1936 | Torigan | 424—147 |

OTHER REFERENCES

Smithells, Colins J.: Metals Reference Book, Interscience Pub. Inc., N.Y. (1949), p. 351.

Jones, L. Meyer: Veterinary Pharmacology and Therapeutics, Iowa State University Press, Ames, Iowa (1965), pp. 943–945, 948–951 and 955.

ALBERT T. MEYERS, Primary Examiner

V. D. TURNER, Assistant Examiner

U.S. Cl. X.R.

424—140, 154